US005961385A

United States Patent [19]

Aoyama et al.

[11] Patent Number: 5,961,385

[45] Date of Patent: Oct. 5, 1999

[54] METHOD FOR PERFORMING DERIVATIVE SCENARIO IN GAME PROGRAM

[75] Inventors: Koji Aoyama; Noriko Tsuruoka, both of Hokkaido, Japan

[73] Assignee: Hudson Soft Co., Ltd., Hokkaido, Japan

[21] Appl. No.: 08/764,014

[22] Filed: Dec. 11, 1996

[30] Foreign Application Priority Data

Dec. 25, 1995 [JP] Japan ................................ 7-350902

[51] Int. Cl.[6] ................................ A63F 9/22

[52] U.S. Cl. ................................ 463/30

[58] Field of Search ................................ 463/1, 30–31; 364/410.1; 395/118, 173, 129, 130, 949, 950, 952, 955

[56] References Cited

U.S. PATENT DOCUMENTS 4,445,187 4/1984 Best .
5,161,034 11/1992 Klappert .
5,267,734 12/1993 Stamper et al. .

*Primary Examiner*—Jessica J. Harrison
*Assistant Examiner*—Mark A. Sager
*Attorney, Agent, or Firm*—McDermott, Will & Emery

[57] ABSTRACT

Disclosed is a method for performing a derivative scenario in a game program operated on a home television game machine, has the steps of: generating the derivative scenario on the basis of a step in the game program; and performing the derivative scenario on the basis of real time proceeded by a first timer means with which a main body or an external storage device of the home television game machine is provided; wherein the derivative scenario is defined to be performed in the process of a relative time and the relative time is related to the real time so that the derivative scenario is performed in the process of the real time.

4 Claims, 1 Drawing Sheet

METHOD FOR PERFORMING DERIVATIVE SCENARIO IN GAME PROGRAM

FIELD OF THE INVENTION

This invention relates to a method for performing a derivative scenario in a game program operated on a home television game machine, and more particularly to, a method for performing a derivative scenario in a game program which is proceeded in the process of time.

BACKGROUND OF THE INVENTION

Recently, a home television game machine which is provided with a timer is developed. Also, a personal computer oftware which employs a timer function is developed.

In general, a home television game is proceeded along a story described on a program. Because of this, in a game programmed to play with a computer, when the story or patterns of the game is almost known by a player, the player will not be so interested in playing it. Particularly in a role playing game, since it always proceeds along the story programmed, it will be boring when the story is almost known. To provide the game story with unexpectedness or reality, some methods are suggested in which a scenery or surrounding is given according to the real time based on the timer in the game machine or the difficulty of the game is changed by generating random numbers.

In the television game software, time is not taken to be so important. Most games are proceeded regardless of the time. The reasons are that most of television game machines are not provided with a timer and that such games proceeded along the timer were not popular with users.

In a game employing a timer function, a base point is determined, and a time period starting from the base point is used. For example, in a car race game in which a time limit is given, if a car reaches a goal within the time limit, a stage of the game can be cleared and the player can try the next stage. In the next stage, a severer time limit or race course is given and the start time is the base point of the time limit. Namely, the start time is zero time(base point), and if the car reaches the goal within the time limit Tn, the player can try the next stage, while, if the car does not reach the goal, the player has to play on the same stage.

Furthermore, some of the computer games of 'go' and 'shogi' (popular games in Japan) have a limitation that a move has to be made within some seconds. In this case, each time a move is made, the base point for the timer is reset to zero.

As described above, most of the conventional game softwares which employ the timer simply use it as the means for determining a time limit. Namely, they do not use the continuous process of real time(actual clock time). This is because most of them have very little story.

On the other hand, in the role playing games which proceed along the story programmed, time can be an important factor for making it more attractive to players. In this case, the timer is used to perform a derivative scenario on real time, where a specified absolute time such as a specific date of a specific month and a time period of a specific date to another specific date is used. However, if the timer(with a calendar function) is set to perform a derivative scenario that a bargain sale is held from December 20th to December 31st, the player cannot enjoy the game with the derivative scenario at a date other than the specified term or day.

SUMMARY OF THE INVENTION

Accordingly, it is an object of the invention to provide a method for performing a derivative scenario in a game program in which the derivative scenario can be always enjoyed in the process of real time without time limitation at any time.

According to the invention, a method for performing a derivative scenario in a game program operated on a home television game machine, comprises the steps of:

generating the derivative scenario on the basis of a stepin the game program; and performing the derivative scenario on the basis of real time proceeded by a first timer means with which a main body or an external storage device of the home television game machine is provided;

wherein the derivative scenario is defined to be performed in the process of a relative time, and the relative time is related to the real time, so that the derivative scenario is performed in the process of the real time.

In accordance with the invention, a plurality of situations in the derivative scenario which are generated in the process of time are provided. The time for generating and performing each of the situations is related to a relative time, wherein a correspondence table between the situations and the relative time is provided. The order of the situations in the correspondence table also corresponds to the order of generating each of the situations. Here, the time of generating the first situation is related with the real time on the basis of a step of the game program. Namely, when the program automatically proceeds to the step, or when a player makes a key operation to proceed to the step in the game program, the time of generating the first situation is converted into a real time(base time) proceeded by the timer means at the time. Therefore, the time of generating the other subsequent situations is decided by the base time and the relative time on the correspondence table. Thus, the derivative scenario can be performed in the process of the real time.

BRIEF DESCRIPTION OF THE DRAWINGS

The invention will be explained in more detail in conjunction with the appended drawings, wherein.

DESCRIPTION OF THE PREFERRED EMBODIMENTS

Figure 1:
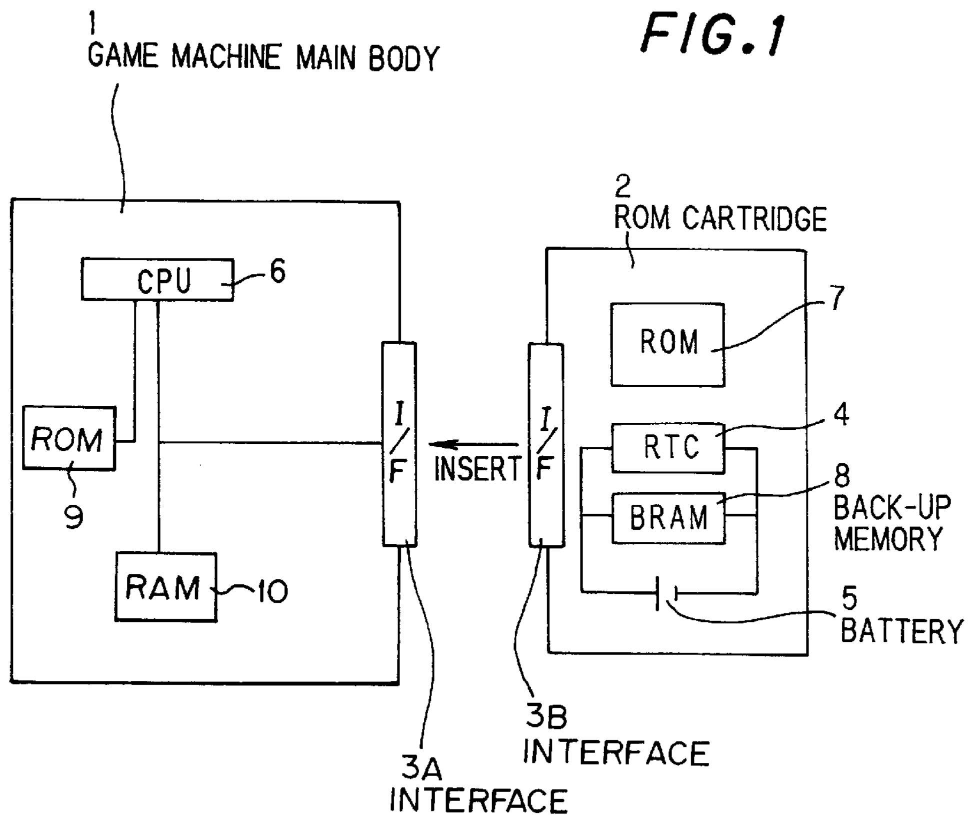
FIG. 1 is a block diagram showing a ROM cartridge with the built-in RTC(real time clock) and a home television game machine which are employed in a preferred embodiment according to the invention.
Figure 2:
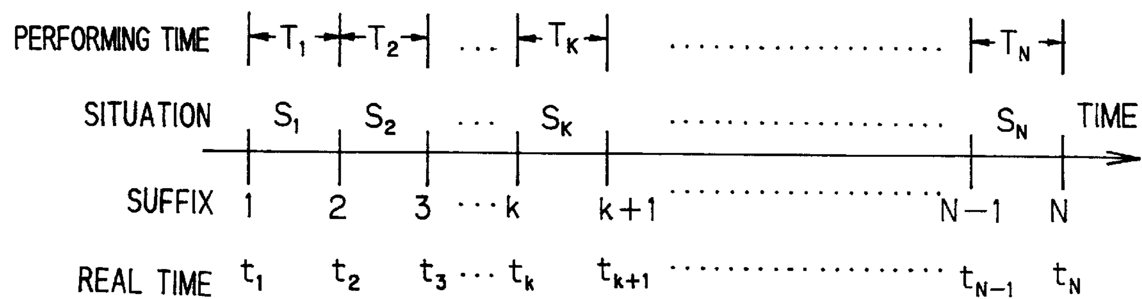
FIG. 2 shows a relationship among a performing time Tk, a situation Sk and a real time tk in the preferred embodiment according to the invention.

A method for performing a derivative scenario in a game program in the preferred embodiment will be explained in FIGS. 1 and 2.

In the embodiment, an external storage device which has a built-in RTC(real time clock) is employed. FIG. 1 shows a relationship between a ROM cartridge with the built-in RTC and a home television game machine. The ROM cartridge 2 with the built-in RTC is connected to the main body 1 of the game machine through both interfaces 3A, 3B.

RTC 4 built in the ROM cartridge 2 automatically ticks away year, month, day, hour, minute and second or day of the week. RTC 4 is backed up by a battery 5 and ticks away independent of the game machine main body 1. CPU 6 of the game machine can read and utilize the time of RTC 4 or can renew the time of RTC. A game software is stored in ROM 7 to be transferred to RAM 10. The game machine main body 1 has ROM for storing an operation program.

In case that RTC is not built in the ROM cartridge 2, a timer means included in the main body 1 of the game machine may be used to achieve the invention.

BRAM 8 is a memory backed up by the battery 5.

Therefore, even if the power of the main body 1 is shut off, contents stored in BRAM 8 will be backed up. In this embodiment, a back-up file is recorded in BRAM 8. The RTC 4 of the ROM cartridge 2 is used as a clock. Incidentally, if the game machine is provided with BRAM and a timer means, ROM cartridges other than the above-mentioned ROM cartridge 2 can be applied to the invention.

Now, a derivative scenario in which situations of number N are included is prepared, where the situations are represented by Sk(k=1 to N). Table 1 shows the relationships between the situations and performing times Tk, where the situations S1 to Sk in Table 1 are placed in the order of the time when each of the situations is performed.

TABLE 1

| | performing time | situation |
|---|---|---|
| 1 | T1 | S1 |
| 2 | T2 | S2 |
| 3 | T3 | S3 |
| | . | . |
| | . | . |
| | . | . |
| k | Tk | Sk |
| | . | . |
| | . | . |
| | . | . |
| N | TN | SN |

The situations mean matters, phenomena or conditions that change with the process of time. For example, in case of a persimmon taken from a tree, the color or shape thereof changes with the process of time. Here, the steps in the change are just the situations. Thus, a time Tk corresponding to the situation Sk has a length of time. Namely, the performing time Tk in Table 1 is a time length given to the situation Sk.

Since the method according to the invention is proceeded based on real time, the performing time Tk is needed to be related with real time. FIG. 2 shows Tk and Sk in Table 1 that are located on a time axis and are corresponded to real time tk(time of RTC), wherein k satisfies $1 \leqq k \leqq N$. If time t1 when the first situation S1 is begun is determined, tk is obtained by the following equation (1):

$$tk=t1+\Sigma Ti-1 \qquad (1)$$

where Σ represents the sum of i=1 to i=k and $T_0$ is expediently 0. The start time t1 is determined by some process on the story. Typically, the time when the derivative scenario is begun is t1. Since tk is obtained when t1 is determined, steps on program and responses to the player are conducted based on the real time t1. Thus, the game can be proceeded while the real time is incorporated in the time of game.

Accordingly, the relative time Tk for which the situation Sk is driven can be represented by the real time tk that RTC ticks away. Namely, if t falls within $tk \leqq t \leqq tk+1$, the situation Sk is performed, or, if t falls within $tN \leqq t$, the situation SN is performed. As such, the relative time Tk can be converted into the real time. Herein, t means the time of RTC, i.e., time when the game is proceeded.

Taking the case of ‘magic box’, an example of this embodiment according to the invention will be explained below. From when the magic box is obtained, the situation begins to change. Namely, the time when the magic box is obtained is t1. For example, the time t1 is determined as:

$$t1\text{=10 minutes and 11 seconds after 9 o'clock on Jul. 8th, 1996} \qquad (2).$$

In this box, a medicinal plant called ‘cure portion’ is contained. Here, since the box is just magical, the effect of the medicinal plant is enhanced with the process of time, subsequently transforming into the situations as shown in Table 2, wherein the situation is described as ‘occurrence (appearing) item’.

TABLE 2

| k | holding time, Tk | occurrence item, Sk |
|---|---|---|
| 1 | 1 hour | none |
| 2 | 3 hours | cure portion |
| 3 | 20 hours | high cure portion |
| 4 | more than 20 hours | all cure portion |

Using the above equations (1) and (2), Table 2 is rewritten as in Table 3.

TABLE 3

| k | tk | Tk | Sk |
|---|---|---|---|
| 1 | 9:10:11 July 8, 1996 | 1 hour | none |
| 2 | 10:10:11 July 8, 1996 | 3 hours | ‘cure portion’ appears |
| 3 | 13:10:11 July 8, 1996 | 20 hours | ‘high cure portion’ appears |
| 4 | 9:10:11 July 9, 1996 | 0 hours | ‘all cure portion’ appears |

The time that the situation Sk occurs is when the magic box is opened. If the player opens the magic box at the time t1 when he gets it, there is nothing in the box. The later the box is opened, the higher effect the medicinal plant has. Namely, the longer the player waits, the more advantageously he can play the game. Here, to obtain the most effective medicinal plant which is ‘all cure portion’, since t is the time of RTC, the box is needed to be opened after more than a whole day is passed.

Even if the power of the game machine main body is shut off, RTC in the ROM cartridge continue to tick away. Therefore, if the player saves the game situation when he gets the magic box, he can advantageously play the game when he opens the box after one day is passed. Until when the box is opened, the player will wait with an expectation to the game. Thus, the player can enjoy a new game feeling.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. A method for performing a derivative scenario in a game program operated on a home television game machine, comprising the steps of:

generating said derivative scenario on a basis of a step in said game program, said derivative scenario having a situation in which an item changes to provide one of at least two different results in accordance with process of real time; and performing said derivative scenario on a basis of said real time proceeded by a real time clock, wherein said derivative scenario is defined to be performed in process of relative time, and said relative time is related to said real time, so that said derivative scenario is performed in process of said real time to exhibit said one of at least two different results in accordance with real time-based change of said item.

2. The method according to claim 1, wherein:

said relative time is started and converted into said real time when said derivative scenario is generated.

3. The method according to claim 1, wherein:

said derivative scenario is generated when said game program proceeds to said step.

4. The method according to claim 3, wherein:

said proceeding to said step is given by a key operation of said player.

* * * * *